(12) United States Patent
Peng

(10) Patent No.: US 8,681,333 B2
(45) Date of Patent: Mar. 25, 2014

(54) CHARACTERIZING OPTICAL ANTENNA NEAR FIELD TRANSDUCERS

(75) Inventor: Chubing Peng, Minnetonka, MN (US)

(73) Assignee: Seagate Technology LLC, Cupertino, CA (US)

(*) Notice: Subject to any disclaimer, the term of this patent is extended or adjusted under 35 U.S.C. 154(b) by 446 days.

(21) Appl. No.: 13/040,636

(22) Filed: Mar. 4, 2011

(65) Prior Publication Data

US 2011/0299080 A1  Dec. 8, 2011

Related U.S. Application Data

(60) Provisional application No. 61/352,088, filed on Jun. 7, 2010.

(51) Int. Cl.
*G01J 4/00* (2006.01)

(52) U.S. Cl.
USPC .......................................... 356/364

(58) Field of Classification Search
USPC ................ 356/364–370; 369/53.38–53.4
See application file for complete search history.

(56) References Cited

U.S. PATENT DOCUMENTS

| | | | |
|---|---|---|---|
| 6,944,112 B2 | 9/2005 | Challener | |
| 7,027,700 B2 | 4/2006 | Challener | |
| 7,151,738 B2 | 12/2006 | Peng | |
| 7,155,732 B2 | 12/2006 | Rausch et al. | |
| 2001/0006436 A1 | 7/2001 | Akiyama et al. | |
| 2005/0289576 A1* | 12/2005 | Challener | 720/658 |
| 2010/0074063 A1 | 3/2010 | Peng et al. | |

FOREIGN PATENT DOCUMENTS

WO  2004003932 A2  1/2004
WO  2005034093 A1  4/2005

* cited by examiner

*Primary Examiner* — Kara E Geisel
*Assistant Examiner* — Dominic J Bologna
(74) *Attorney, Agent, or Firm* — Mitchell K. McCarthy; McCarthy Law Group

(57) ABSTRACT

An apparatus and associated method for characterizing a near field transducer (NFT) is provided that has computer instructions stored in memory and executable to perform computational logic that, in response to a selected electromagnetic radiation excitation of resonant collective oscillations on a surface of the NFT, compares a magnitude of a depolarization field associated with the excited resonant collective oscillations to a predetermined threshold to characterize the NFT in terms of demonstrated radiant efficiency performance.

23 Claims, 8 Drawing Sheets

CHARACTERIZING OPTICAL ANTENNA NEAR FIELD TRANSDUCERS

RELATED APPLICATIONS

This application claims the benefit of the filing date of the earlier filed application Ser. No. 61/352,088.

SUMMARY

In some embodiments a near field transducer (NFT) characterization device is provided that has computer instructions stored in memory and executable to perform computational logic that, in response to a selected electromagnetic radiation excitation of resonant collective oscillations on a surface of the NFT, compares a magnitude of a depolarization field associated with the excited resonant collective oscillations to a predetermined threshold to characterize the NFT in terms of demonstrated radiant efficiency performance.

In some embodiments an apparatus is provided that characterizes a near field transducer (NFT). The NFT has a grating that directs incident light to a waveguide that in turn polarizes the light in a desired mode along a waveguide plane that is substantially parallel to illumination. The NFT has a resonant optical antenna to which the waveguide focuses the polarized light to excite resonant collective oscillations on the antenna. The characterization device has a linear polarizer operably receiving electromagnetic radiation transmitted by the NFT. The linear polarizer has an optical axis that is substantially orthogonal to the waveguide plane. The characterization device further has an optical detector coupled to the linear polarizer operably quantifying the field strength of the excited resonant collective oscillations. The characterization device further has a characterization module that compares the quantified field strength of the excited resonant collective oscillations to a predetermined threshold value to characterize the radiant efficiency of the NFT.

In some embodiments a method is provided that characterizes a near field transducer (NFT) having a grating in communication with a waveguide that polarizes incident light in a desired mode along a waveguide plane that is substantially parallel to illumination and, in turn, communicates the polarized light to a resonant optical antenna. The method includes directing electromagnetic radiation to the grating to excite resonant collective oscillations on the antenna; polarizing electromagnetic radiation transmitted by the NFT substantially orthogonal to the waveguide plane; quantifying the field strength of the excited resonant collective oscillations; comparing the quantified field strength of the excited resonant collective oscillations to a predetermined threshold value; and characterizing the NFT in terms of demonstrated radiant efficiency based on results of the comparing step.

DETAILED DESCRIPTION

Heat assisted magnetic recording (HAMR) and the like in optical recording employs localized heating of the storage media while data is being stored to it. In magnetic recording the storage density is otherwise limited by the superparamagnetic limit of the storage media, which causes the magnetized grains to gradually lose a particular magnetic state over time. Heating the media at the precise point that the data is stored, such as by selectively directing electromagnetic energy from a laser to the media, temporarily reduces the magnetic anisotropy of the media. After cooling, the magnetic anisotropy returns to the relatively high value to stabilize the stored magnetic state.

The tiny and confined optical spot needed for HAMR can be achieved by employing a near field transducer (NFT) having an optical antenna. Electromagnetic radiation can be directed to a surface of the optical antenna to excite resonant collective oscillations, also referred to as plasmons, at the interface between a plasmonic metal of free electrons (such as Au, Cu, and Ag in the visible to infrared frequencies) and a dielectric material (such as $Al_2O_3$, $SiO_2$, $Ta_2O_5$, and $SiN_x$). A desired excitation advantageously causes a high field due to the collective oscillations of electrons in the metal, increasing the interaction between light and matter. Part of the field tunnels into the nearby storage medium and by absorption raises its temperature.

Dark field microscopy is used in some attempted solutions aimed at characterizing the radiant efficiency of an optical antenna NFT. However, the incident light (bright field) necessary to excite the optical antenna makes those solutions problematic when employed in actual devices. Some other solutions attempt to remedy those difficulties by employing two-photon photoluminescence solutions. However, such solutions require a high level of incident optical power such as can damage the devices under test.

Figure 1:
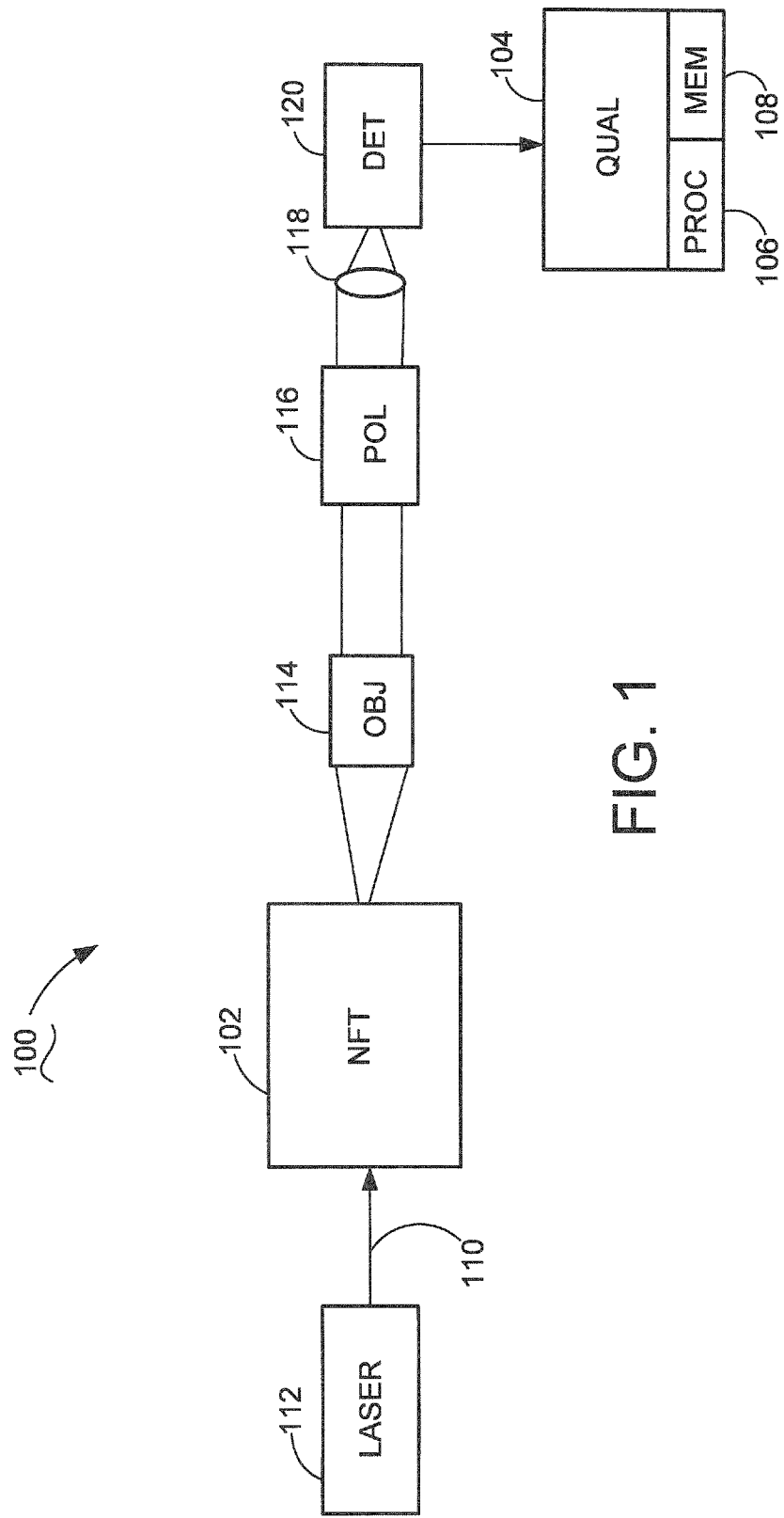
FIG. 1 is a functional block diagram of a characterization device that is constructed in accordance with embodiments of the present invention.

The efficiency of this radiant transfer has been determined by the present embodiments to be a function not only of the material of which the optical antenna is constructed, but also a function of the shape of the optical antenna and the wavelength of the electromagnetic radiation used to excite the optical antenna. FIG. 1 depicts a functional block diagram of a characterization device 100 that quantitatively characterizes the radiant efficiency of a near field transducer (NFT) 102 in accordance with embodiments of the present invention. The device 100 includes a characterization module 104 controlled by a processor 106 that selectively executes computer instructions stored in memory 108 to perform computational logic to perform the characterization.

For purposes of this description and meaning of the claims, the term "memory" such as memory 108 means a tangible data storage device, including non-volatile memories (such as flash memory and the like) and volatile memories (such as dynamic random access memory and the like). The computer instructions either permanently or temporarily reside in the memory, along with other information such as data, virtual mappings, operating systems, applications, and the like that are accessed by a computer processor to perform the desired functionality. The term "memory" expressly does not include a transitory medium such as a carrier signal, but the computer instructions can be transferred to the memory wirelessly.

The meaning of the term "characterization" in this description and the claims specifically encompasses either a quantitative or a qualitative characterization. A qualitative characterization generally means that a particular quality of the NFT is characterized by the device 100, such as but not limited to whether it is a "conforming NFT," one that meets predetermined manufacturing specifications and as such can be accepted in a manufacturing process employing the device 100, or else it is a "nonconforming NFT" and as such can be rejected in the manufacturing process by the device 100. A quantitative characterization is one made in terms of a numerical measurement. As discussed below, in some embodiments the device 100 computes quantitative a characterization(s) in order to ultimately perform a qualitative characterization.

The characterization module 104 is responsive to selectively sent electromagnetic radiation 110 to the NFT 102. In these illustrative embodiments the electromagnetic radiation 110 is produced by a laser 112. An objective lens 114 of a relatively high numerical aperture collects and collimates the beam transmitted by the NFT 102. A linear polarizer 116 and a lens 118 discriminates the polarization field from the depolarization field; the depolarization field being that which is generated by the excited resonant collective oscillations. A detector 120 is used to quantify the generated field strengths. In these illustrative embodiments the detector 120 is constructed of a photoelectronic sensor providing input to a charge-coupled device (CCD), although the claimed embodiments are not so limited. Field profile values from the detector 120 are input to the characterization module 104, which then characterizes the NFT 102 under test in terms of its radiant efficiency.

Figure 2:
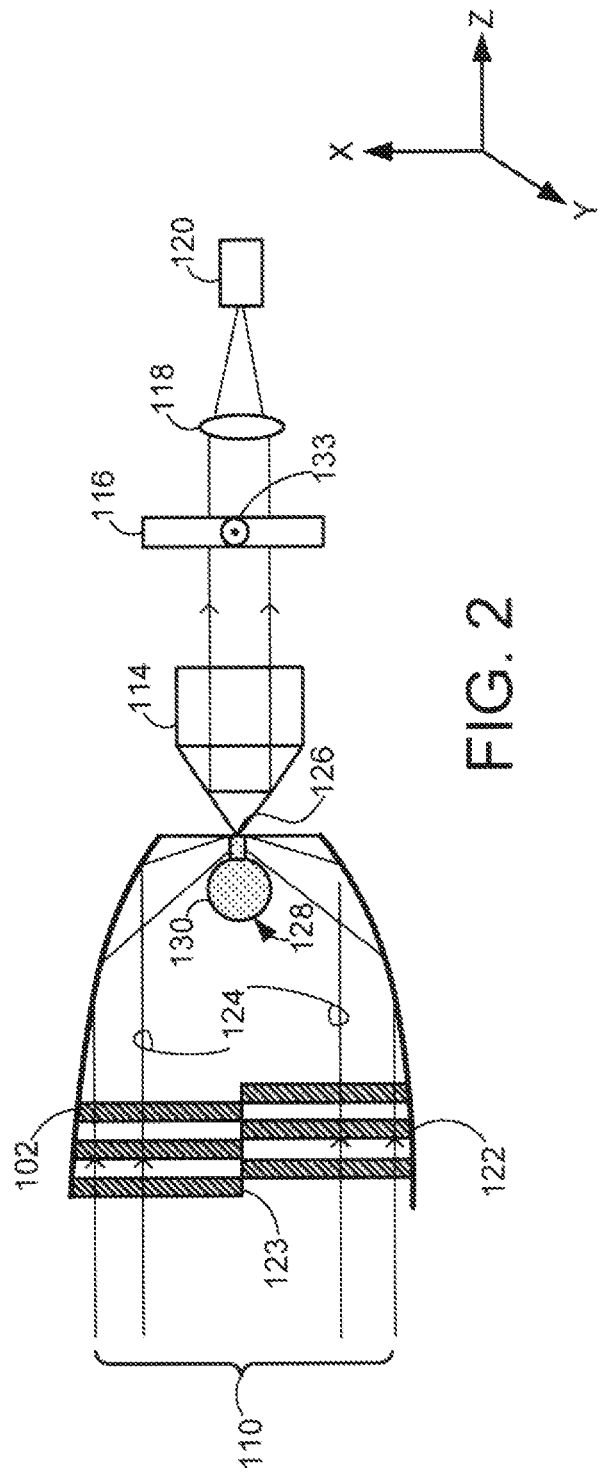
FIG. 2 is a diagrammatic depiction of a portion of the device of FIG. 1.

FIG. 2 diagrammatically depicts the NFT 102 having a planar waveguide 122 shaped in the form of a planar solid immersion mirror (PSIM). A split grating 123 couples the incident light 110 into the planar waveguide 122. Electromagnetic radiation in the form of polarized light, illustrated by arrows 124 is directed onto the grating 123. The light propagating in the planar waveguide 122 before striking the PSIM is either transverse electric (TE) or transverse magnetic (TM) polarized with the electric or magnetic field disposed in a plane that is parallel to the planar waveguide 122. The PSIM is shaped such that the light is focused at a focal point 126. A metallic optical antenna 128, preferably made of a metal such as gold, silver, aluminum, or copper, is positioned at the focal point 126.

At the focal point 126, the grating 123 causes the light's electric field to be polarized longitudinally along the PSIM's axis of symmetry. The longitudinal electric field couples strongly to the optical antenna 128. Under illumination, the collective oscillations (surface waves) on the optical antenna 128 are excited at a certain wavelength. The electric field on the optical antenna 128, generally orthogonal to its surface, generates a field component from that excitation (resonant collective oscillations) that is directed orthogonal to that of the illumination, also referred to as depolarization. An appropriately configured optical antenna 128 will resonate with the incident light to generate extremely large fields that can be aimed at a recording medium in the vicinity of the end of the transducer to perform HAMR.

Figure 3:
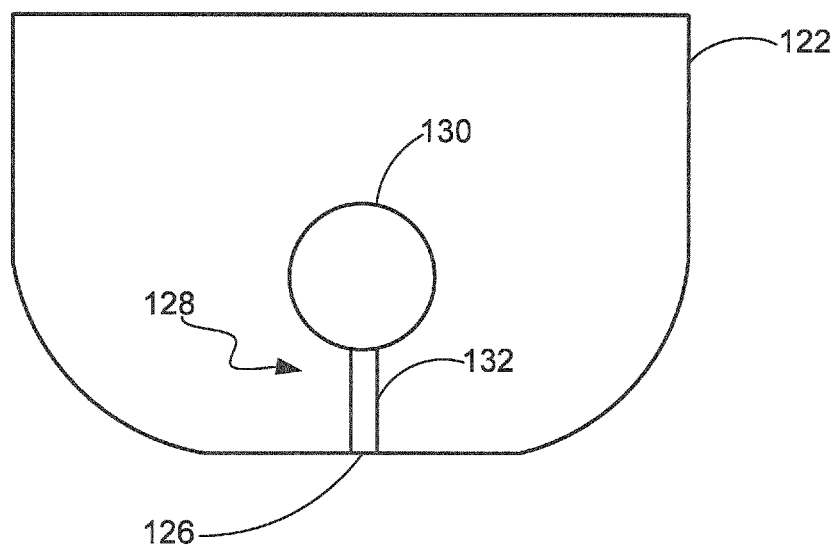
FIG. 3 diagrammatically depicts the optical antenna in the device of FIG. 2.

FIG. 3 more particularly depicts in these illustrative embodiments the optical antenna 128 is of a particularly advantageous configuration, although the claimed embodiments are not limited to that configuration. Here, the optical antenna 128 has a first section 130 of a disk shape and a second section 132 of a rectangular pin shape. That configuration combines both the advantage of the disk shape at a proximal end for shifting the resonance to shorter wavelengths as well as the advantage of the elongated shape at the distal end to create a lightning rod effect that confines the spot size. More generally, the first section should be larger than the second section in both length and width. Particularly, the first section is wider than the second section and the first section has a width to length aspect ratio greater than or equal to a width to length aspect ratio of the second section. Preferably, the first section includes an arcuate surface to avoid disruptive points that concentrate the field energy. Although not depicted, other advantageous features can be provided such as but not limited to tapering the second section at the distal end.

Returning to FIG. 2, the linear polarizer 116 is inserted in the transmitted beam path from the NFT 102 via the objective lens 114. The linear polarizer 116 has an optical axis that is substantially orthogonal to the plane defined by the planar waveguide 122. For example, in the depicted embodiments of FIG. 2 the first section 130 of the optical antenna 128 has a planar surface that is parallel to the plane defined by the planar waveguide 122, which is disposed parallel to the sheet in the X-Z plane. Thus, the direction of the linear polarizer's 116 optical axis is depicted by the top view of a bidirectional arrow 133 pointing outward from and inward into the sheet in the X-Y plane.

Figure 4A:
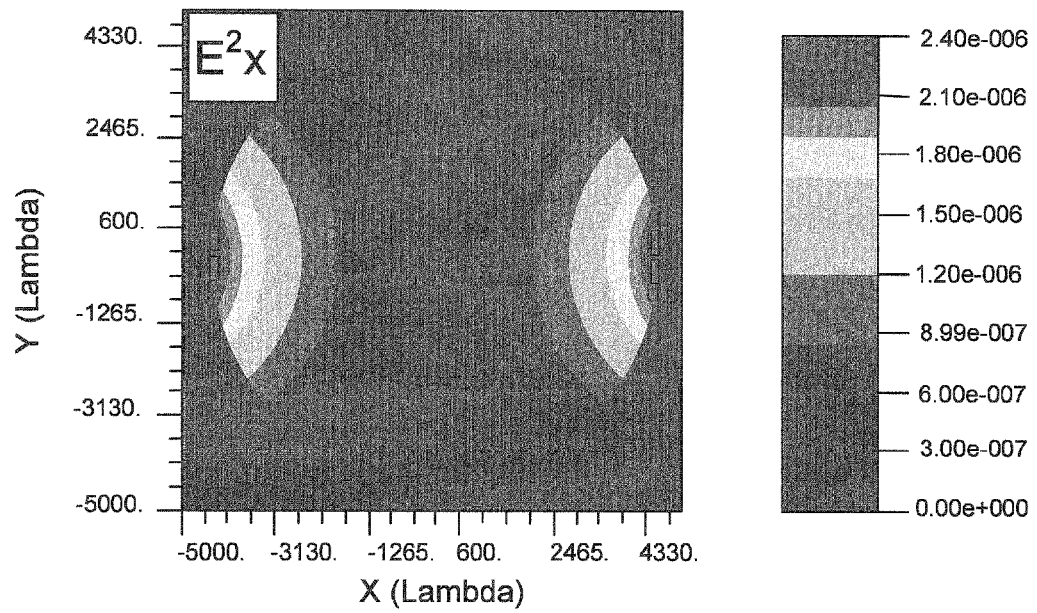
FIGS. 4A, 4B, 5A, and 5B graphically depict test results obtained during reduction to practice of the present embodiments.
Figure 4B:
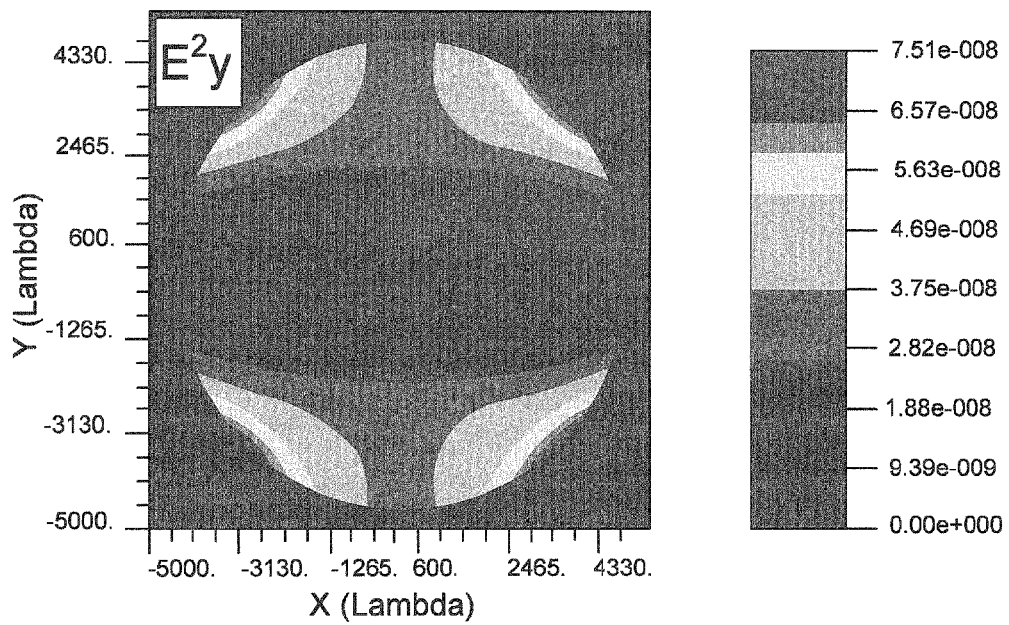

FIGS. 4A and 4B depict baseline experimental measurements obtained from the detector 120 for the electric field strengths, $E_x^2$ and $E_y^2$ respectively, transmitted at the exit pupil of the objective lens 114 from an NFT 102 having no antenna. The numerical aperture of the objective lens is 0.9. The core layer of the planar waveguide 122 is $Ta_2O_5$, which is 120 nm thick and has an index of refraction of n=2.15. The cladding layers are $Al_2O_3$, with n=1.65. The light propagating in the planar waveguide 122 in the Z direction is fundamental TE mode, polarized parallel to the plane defined by the planar waveguide 122 along the X direction. The incident beam in the Z direction is Gaussian with 50 μm full-width at its $1/e^2$ intensity points. The PSIM has parabolic reflection sidewalls and is 50 μm wide at the entrance and 100 μm long in the Z direction. The angles of the optical rays reflected from the PSIM parabolic sidewall in relation to the Z axis range from 14° to 90°. The central obscuration of the PSIM is about 6 μm. The optical antenna 128 is constructed of gold film and configured as described above, having the first section 130 that is disk shaped and the second section 132 that is rectangularly pin shaped. Without an optical antenna 128, measurements depicted by FIGS. 4A and 4B have dark central zones, with transmitted radiant energy showing up at the four corners in the exit pupil due to optical ray bending in the objective lens 114.

Figure 5A:
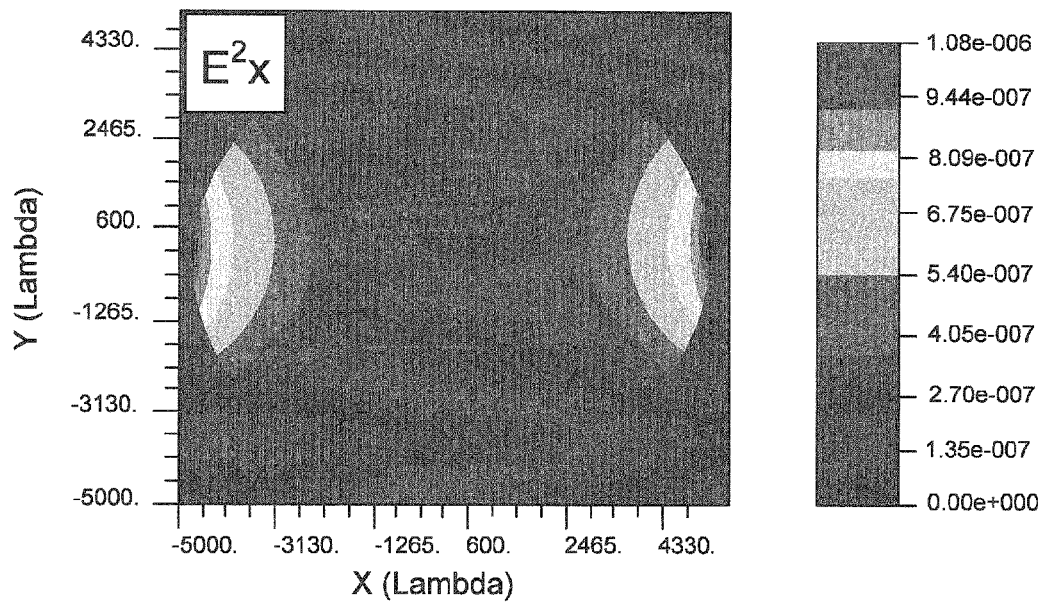
Figure 5B:
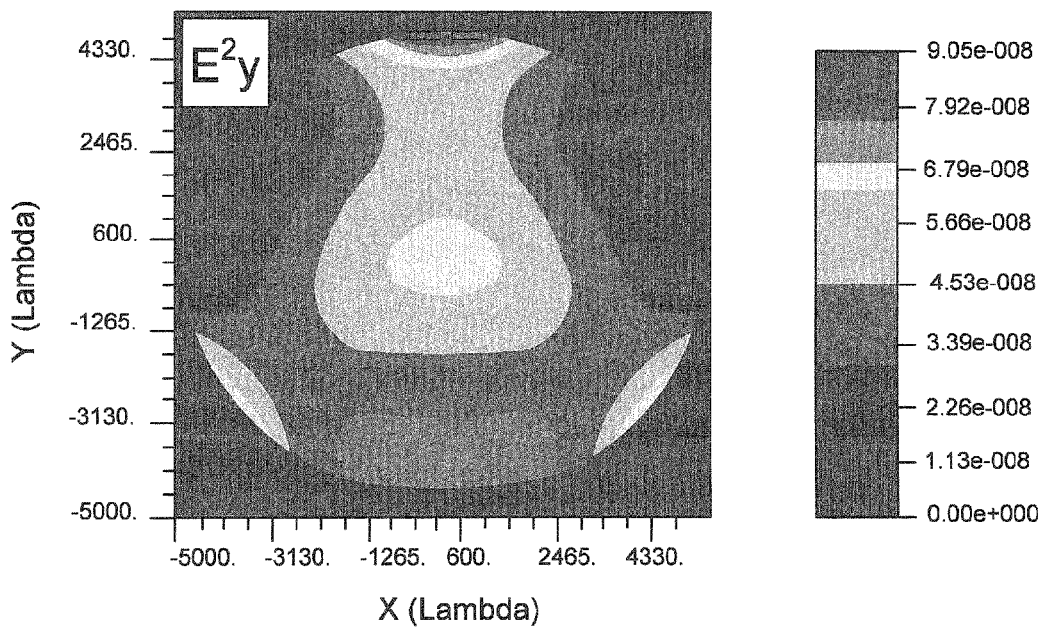

In comparison, FIGS. 5A and 5B depict the NFT 102 outfitted with an optical antenna 128 having the first section 130 constructed of a 190 nm disk diameter and 20 nm thick. The second section 132 is 35 nm wide (in X direction) and 60 nm long (in Z direction). The optical antenna 128 is placed in one of the cladding layers and the spacing between the core/ cladding interface and the surface of the optical antenna is 25 nm. The excitation wavelength is 895 nm.

Comparing FIG. 5A to FIG. 4A shows that the $E_x^2$ profile at the exit pupil of the objective lens 114 is substantially the same with and without the optical antenna 128. The $E_y^2$ profiles, however, are significantly different. Instead of the central dark zone of the $E_y^2$ profile in FIG. 4B, the $E_y^2$ profile in FIG. 5B appears at the whole exit pupil for being stronger than the optical ray bending in the objective lens. The characterization module 104 can calculate a depolarization ratio that characterizes the radiant efficiency of the NFT from these measurements by the detector 120 in terms of:

$$\frac{I_y}{I_x} = \frac{\int E_y^2 dx dy}{\int E_x^2 dx dy}$$

Figure 6:
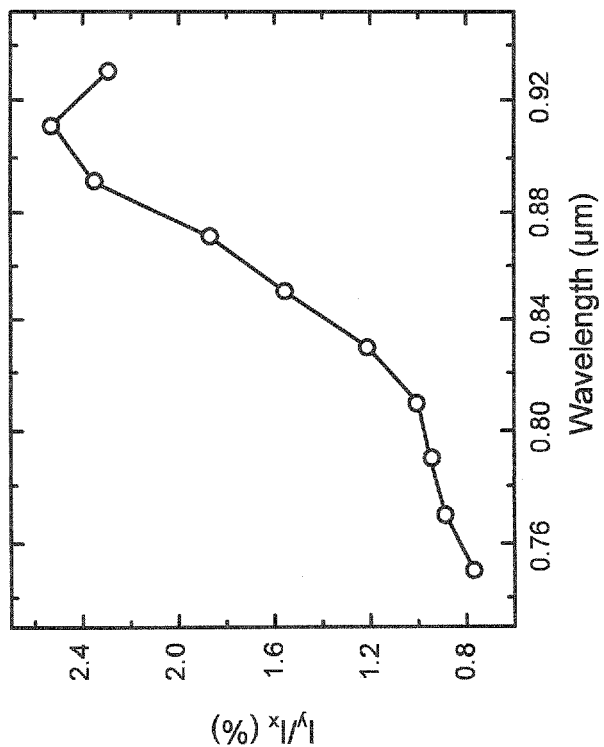

FIG. 6 depicts graphical data obtained during experimentation with the optical antenna described above, showing how the depolarization ratio varies for different values of excitation laser wavelength. Resonant wavelengths are indicated at about 790 nm and at about 895 nm. FIG. 5B depicts the $E_y^2$ profile at this greatest resonant wavelength of 895 nm. Preferably, mass production testing on NFTs 102 is performed at or near the greatest resonant wavelength to take advantage of the maximum discrimination indicated by the depolarization ratio. However, the empirical analysis can also be used to select a less expensive, more commercially readily available laser. In any event, the characterization module 104 of the present embodiments operably compares the quantified electric field strength of the excited resonant collective oscillations to a predetermined threshold value to characterize the radiant efficiency of the NFT 102. Particularly, in these illustrative embodiments the NFT 102 can employ a laser delivering the excitation wavelength of 895 nm, and compare the depolarization ratio to the empirically obtained threshold depolarization ratio of about 2.6%. A qualitative characterization can be defined in terms of a comparison to a certain bandwidth around the empirically derived threshold target value, for example plus or minus 2% of the threshold target.

Figure 7:
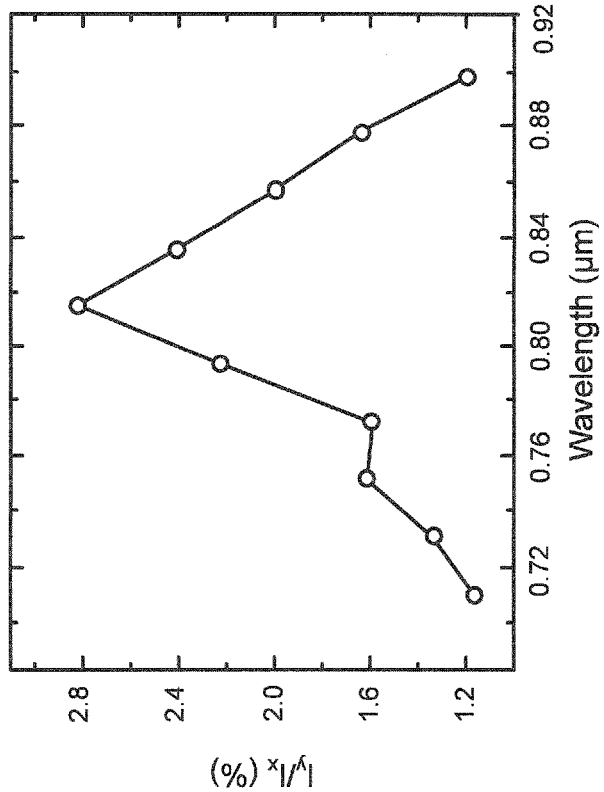
FIGS. 6 and 7 graphically depict summaries of observations of the relationship between excitation wavelength and depolarization ratio obtained during reduction to practice of the present embodiments.

FIG. 7 is a graph similar to that of FIG. 6, but illustratively showing how a change in the optical antenna 128 configuration alters the relationship between excitation wavelength and depolarization ratio. The data in FIG. 7 was obtained by testing another NFT 102 having an optical antenna 128 constructed of a disk that is 140 nm in diameter and 20 nm thick. The longitudinal pin is 12.5 nm wide and 60 nm long. It will be noted that for this optical antenna 128 the resonant wavelengths shifted to about 760 nm and 820 nm and are comparatively sharper than for the NFT 102 radiant efficiency performance reflected by the data in FIG. 6.

Figure 8:
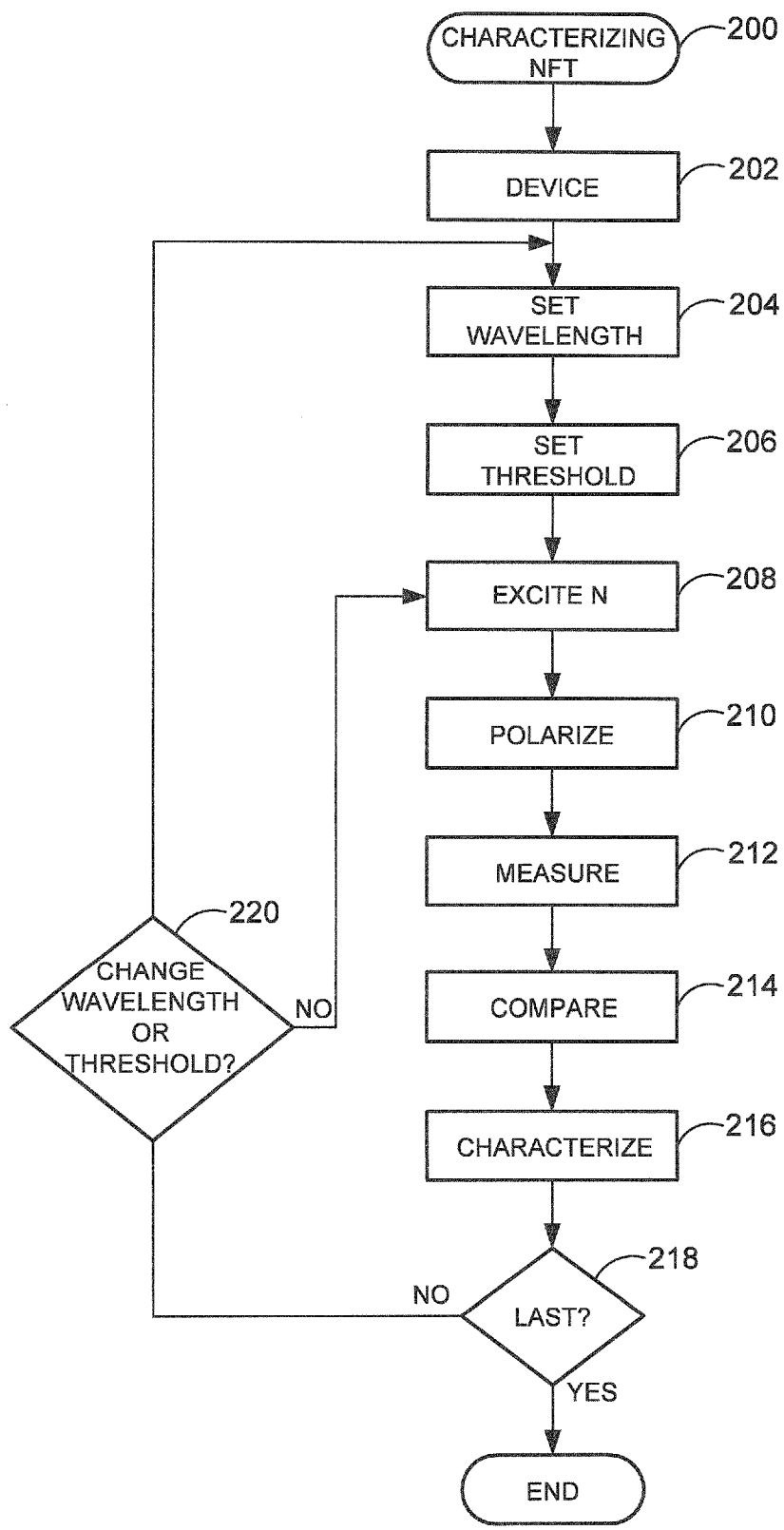
FIG. 8 is a flowchart of steps in a method for CHARACTERIZING AN NFT in accordance with embodiments of the present invention.

The present embodiments also contemplate a method 200 as illustratively shown by the flowchart in FIG. 8 depicting steps in computational logic embodied by computer instructions stored in the memory 108 and executed by the processor 106 in the characterization module 104 to characterize an NFT 102. The method 200 begins in block 202 with obtaining the characterization device 100 as described, that characterizes the radiant efficiency of the NFT 102, having the grating in communication with the planar waveguide 122 that polarizes incident light in a desired mode along a waveguide plane that is substantially parallel to illumination and, in turn, communicates the polarized light to the resonant optical antenna 128. The method continues in block 204 by determining the excitation wavelength. As described, this can be done by empirically testing a sample of NFTs 102 across multiple excitation wavelengths to ascertain the greatest resonant wavelength. In some embodiments the greatest resonant wavelength is selected in order to take advantage of the maximum possible discrimination between the polarization field and the depolarization field. In other embodiments, the testing wavelength can be varied within a preset band of an initially selected wavelength, such as around the greatest resonant wavelength. The characterization in that instance would be in view of whether the NFT radiant efficiency met the resonant threshold (within the band) at off-resonant wavelengths. Alternatively, a less expensive solution can be had by selecting the wavelength of a commercially available industry standard general purpose laser and empirically testing a sample of NFTs 102 to ascertain the expected depolarization ratio at that excitation wavelength.

Control then passes to block 206 which sets the desired threshold value for characterizing the NFTs, such as the bandwidth around the expected target depolarization ratio for the test wavelength set in block 204. With the excitation wavelength and the threshold value set, testing of $NFT_N$ begins in block 208 by energizing the laser to excite the optical antenna. The beam from the NFT is polarized orthogonal to the NFT waveguide plane in block 210. The field strengths in the direction of polarization and in the direction of depolarization are measured in block 212, and then compared to compute the depolarization ratio in block 214. In block 216 the depolarization ratio is compared to the threshold as defined in block 206.

In block 218 it is determined whether the last NFT has been tested. If the determination of block 218 is yes, then the method 200 ends. Otherwise, control passes to block 220 where it is determined whether it would be advantageous to adjust the excitation wavelength and/or the threshold value. Doing so would permit testing one NFT at two or more different wavelengths and against the associated thresholds. Doing so would also permit adjusting the threshold for a particular wavelength, as might be advantageous under statistical process control when it indicates that the manufacturing process is performing at less than an expected process capability due to observed process variation.

Figure 9A:
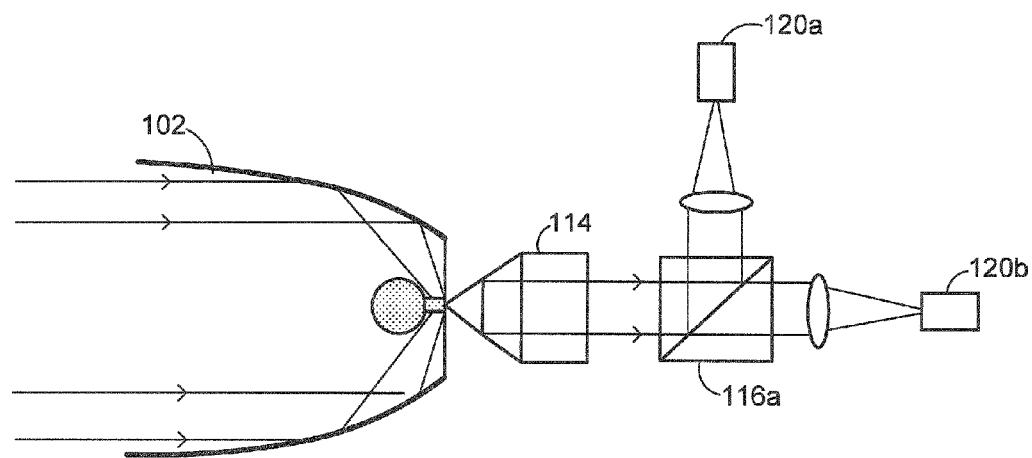
FIG. 9A is a diagrammatic depiction of a portion of the device of FIG. 1 constructed in accordance with alternative contemplated embodiments employing a polarizing beamsplitter and two detectors.
Figure 9B:
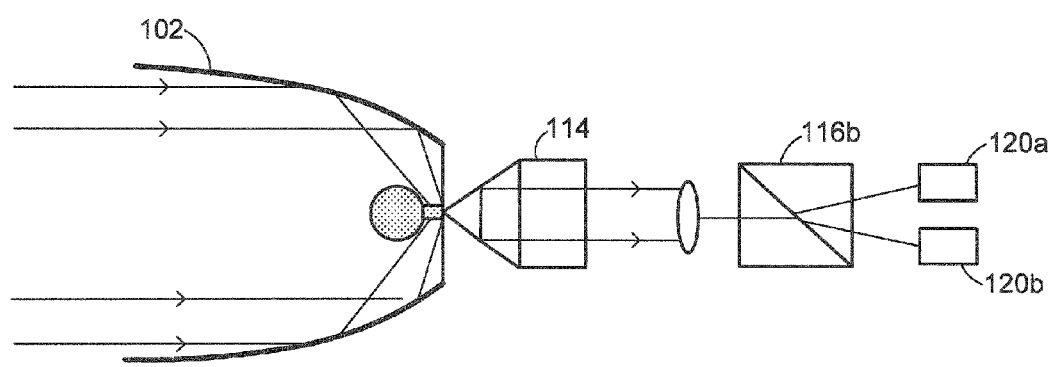
FIG. 9B is a diagrammatic depiction of a portion of the device of FIG. 1 constructed in accordance with alternative contemplated embodiments employing a Wolloston prism and two detectors.

FIG. 9A diagrammatically depicts alternative equivalent embodiments wherein a polarizing beamsplitter 116a is employed, and FIG. 9B similarly depicts embodiments employing a Wollaston prism 116b. In either case, a first optical detector 120a is aligned with the linear polarizer (beamsplitter) 116a to quantify the field strength of the polarization, and a second optical detector 120b is aligned with the linear polarizer (beamsplitter) 116b to measure the field strength of the depolarization.

These described embodiments are useful for testing NFTs used in magnetic and optical recording heads for use with magnetic and/or optical recording media, as well as in magnetic and/or optical recording heads included in such devices as disc drives and the like. The embodiments of this invention can also be used in optical recording applications in which either a magnetic field is not needed, such as write once and phase change recording, or where an external magnet could be positioned below the substrate, such as in magneto-optic recording. Alternatively, these embodiments can be useful in a probe storage application or in other applications where it is desirable to subject a small area to electromagnetic radiation.

Although the present embodiments have been described with reference to preferred embodiments, workers skilled in the art will recognize that changes may be made in form and detail without departing from the spirit and scope of the invention. It is to be understood that even though numerous characteristics and advantages of various embodiments of the invention have been set forth in the foregoing description, together with details of the structure and function of various embodiments of the invention, this disclosure is illustrative only, and changes may be made in detail, especially in matters of structure and arrangement of parts and values for the described variables, within the principles of the present embodiments to the full extent indicated by the broad general meaning of the terms in which the appended claims are expressed.

What is claimed:

1. A near field transducer (NFT) characterization device comprising:
   computer instructions stored in memory and executable to perform computational logic that, in response to a selected electromagnetic radiation excitation of resonant collective oscillations on a surface of the NFT, compares a magnitude of a depolarization field associated with the excited resonant collective oscillations to a predetermined threshold to characterize the NFT in terms of demonstrated radiant efficiency performance.

2. The device of claim 1 wherein the NFT has a grating that directs incident light to a waveguide that in turn polarizes the light in a desired mode along a waveguide plane that is substantially parallel to illumination, and comprising a linear polarizer operably receiving the electromagnetic radiation transmitted by the NFT, the linear polarizer having an optical axis that is substantially orthogonal to the waveguide plane.

3. The device of claim 2 comprising an optical detector coupled to the linear polarizer operably quantifying the depolarization field strength.

4. The device of claim 3 wherein the linear polarizer is characterized as a polarizing beamsplitter.

5. The device of claim 4 wherein the linear polarizer is characterized as a Wolloston prism.

6. The device of claim 4 wherein the optical detector is characterized as a first optical detector that is aligned with the polarizing beamsplitter to quantify a polarization field strength, and comprising a second optical detector that is aligned with the polarizing beamsplitter to quantify the depolarization field strength.

7. The device of claim 3 wherein the optical detector comprises a photoelectric sensor and a charge-coupled device.

8. The device of claim 1 comprising a resonant optical antenna having a first section and a second section, wherein the first section is wider than the second section and the first section has a width to length aspect ratio greater than or equal to a width to length aspect ratio of the second section.

9. The device of claim 8 wherein the first section is disk shaped.

10. The device of claim 8 wherein the second section is rectangularly shaped.

11. An apparatus that characterizes a near field transducer (NFT), the NFT having a grating that directs incident light to a waveguide that in turn polarizes the light in a desired mode along a waveguide plane that is substantially parallel to illumination, and the NFT having a resonant optical antenna to which the waveguide focuses the polarized light to excite resonant collective oscillations on the antenna, the apparatus comprising:
   a linear polarizer operably receiving electromagnetic radiation transmitted by the NFT, the linear polarizer having an optical axis that is substantially orthogonal to the waveguide plane;
   an optical detector coupled to the linear polarizer operably quantifying the field strength of the excited resonant collective oscillations; and
   a characterization module that compares the quantified field strength of the excited resonant collective oscillations to a predetermined threshold value to characterize the radiant efficiency of the NFT.

12. The apparatus of claim 11 wherein the waveguide comprises a planar solid immersion mirror operably focusing the incident light onto the resonant optical antenna.

13. The apparatus of claim 11 wherein the linear polarizer is characterized as a polarizing beamsplitter.

14. The apparatus of claim 13 wherein the linear polarizer is characterized as a Wolloston prism.

15. The apparatus of claim 13 wherein the optical detector is characterized as a first optical detector that is aligned with the polarizing beamsplitter to quantify a polarization field strength, and comprising a second optical detector that is aligned with the polarizing beamsplitter to quantify the strength of the excited resonant collective oscillations.

16. The apparatus of claim 11 wherein the optical detector comprises a photoelectric sensor and a charge-coupled device.

17. The apparatus of claim 11 wherein the resonant optical antenna is characterized as including a first section and a second section, wherein the first section is wider than the second section and has a width to length aspect ratio greater than or equal to a width to length aspect ratio of the second section.

18. The apparatus of claim 17 wherein the first section is disk shaped.

19. The apparatus of claim 17 wherein the second section is rectangularly shaped.

20. A method that characterizes a near field transducer (NFT) having a grating in communication with a waveguide that polarizes incident light in a desired mode along a waveguide plane that is substantially parallel to illumination and, in turn, communicates the polarized light to a resonant optical antenna, the method comprising:
   directing electromagnetic radiation to the grating to excite resonant collective oscillations on the antenna;
   polarizing electromagnetic radiation transmitted by the NFT substantially orthogonal to the waveguide plane;
   quantifying the field strength of the excited resonant collective oscillations;
   comparing the quantified field strength of the excited resonant collective oscillations to a predetermined threshold value; and
   characterizing the NFT in terms of demonstrated radiant efficiency based on results of the comparing step.

21. The method of claim 20 comprising:
   performing the directing step by setting the electromagnetic radiation to each of a plurality of different wavelengths;
   performing the quantifying step for each of the plurality of wavelengths;
   determining a resonant wavelength from results of the performing steps; and
   defining the predetermined threshold value as being associated with the resonant wavelength.

22. The method of claim 21, after the defining the predetermined threshold value step, wherein the directing step is characterized by employing the resonant wavelength.

23. The method of claim 21, after the defining the predetermined threshold value step, wherein the directing step is characterized by employing a non-resonant wavelength.

* * * * *